(12) United States Patent
Krishnan et al.

(10) Patent No.: US 7,870,026 B2
(45) Date of Patent: Jan. 11, 2011

(54) SELECTING AND DISPLAYING ADVERTISEMENT IN A PERSONAL MEDIA SPACE

(75) Inventors: Gopal Krishnan, San Jose, CA (US); Raj Vemulpalli, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 521 days.

(21) Appl. No.: 11/760,584

(22) Filed: Jun. 8, 2007

(65) Prior Publication Data

US 2008/0307052 A1 Dec. 11, 2008

(51) Int. Cl.
G06F 15/16 (2006.01)
(52) U.S. Cl. .............. 705/14.49; 705/14.16; 705/14.53; 705/14.66; 709/205
(58) Field of Classification Search .................. 705/10, 705/14, 14.49, 14.53, 14.66; 709/205
See application file for complete search history.

(56) References Cited

U.S. PATENT DOCUMENTS

| | | | | |
|---|---|---|---|---|
| 5,991,735 | A * | 11/1999 | Gerace | 705/10 |
| 7,337,127 | B1 * | 2/2008 | Smith et al. | 705/14 |
| 7,562,304 | B2 * | 7/2009 | Dixon et al. | 715/738 |
| 7,669,123 | B2 * | 2/2010 | Zuckerberg et al. | 715/273 |
| 7,725,492 | B2 * | 5/2010 | Sittig et al. | 707/784 |
| 7,747,537 | B2 * | 6/2010 | Grim et al. | 705/67 |
| 2002/0140732 | A1 * | 10/2002 | Tveskov | 345/763 |
| 2004/0031058 | A1 * | 2/2004 | Reisman | 725/112 |
| 2004/0054602 | A1 * | 3/2004 | Ozaki | 705/26 |
| 2004/0215721 | A1 * | 10/2004 | Szeto et al. | 709/204 |
| 2005/0234998 | A1 * | 10/2005 | Lesandrini et al. | 707/104.1 |
| 2005/0261964 | A1 | 11/2005 | Fang | |
| 2006/0080702 | A1 * | 4/2006 | Diez et al. | 725/30 |
| 2006/0136298 | A1 * | 6/2006 | Klein et al. | 705/14 |
| 2006/0282328 | A1 * | 12/2006 | Gerace et al. | 705/14 |
| 2006/0293949 | A1 * | 12/2006 | Grossnickle et al. | 705/14 |
| 2007/0255831 | A1 * | 11/2007 | Hayashi et al. | 709/226 |

(Continued)

FOREIGN PATENT DOCUMENTS

KR 2002-0029270 4/2002

(Continued)

*Primary Examiner*—John G Weiss
*Assistant Examiner*—Adam Chornesky
(74) *Attorney, Agent, or Firm*—Martine Penilla & Gencarella, LLP

(57) ABSTRACT

The embodiments provide methods of selecting relevant advertisement to target users by utilizing the knowledge of friends or acquaintance of the target users. The target users and friends or acquaintances of the target users belong to the same on-line communities, groups, or circles. In an exemplary embodiment, a method for providing advertising content for display in a personal media space of an Internet networking tool of a user is provided. The method includes defining the personal media space in a display region of a graphical user interface window. The personal media space being controlled by the user in terms of content. The method also includes selecting an advertisement content unit to be added to the personal media space for display by the user. The method further includes establishing a communication session between the user and another user. The communication session includes an interaction space for enabling communication between the user and the other user. The interaction space is displayed in the graphical user interface window along with the personal media space and the advertising content unit selected by the user to be displayed in the personal media space.

25 Claims, 9 Drawing Sheets

U.S. PATENT DOCUMENTS

2007/0299933 A1* 12/2007 Moon .................. 709/218
2008/0077595 A1* 3/2008 Leebow ................ 707/10
2008/0082405 A1* 4/2008 Martinez et al. ........ 705/14
2008/0082904 A1* 4/2008 Martinez et al. ........ 715/205
2008/0082905 A1* 4/2008 Martinez et al. ........ 715/205
2008/0307052 A1* 12/2008 Krishnan et al. ....... 709/205
2008/0307320 A1* 12/2008 Payne et al. .......... 715/751
2009/0048922 A1* 2/2009 Morgenstern et al. .... 705/14
2009/0182833 A1* 7/2009 Balasubramanian ..... 709/208

FOREIGN PATENT DOCUMENTS

WO    WO 2006/073238    7/2006

* cited by examiner

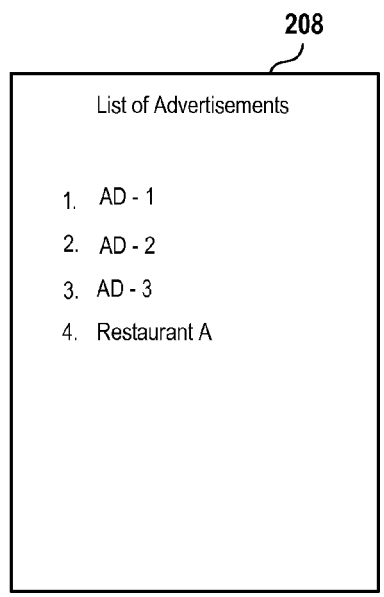
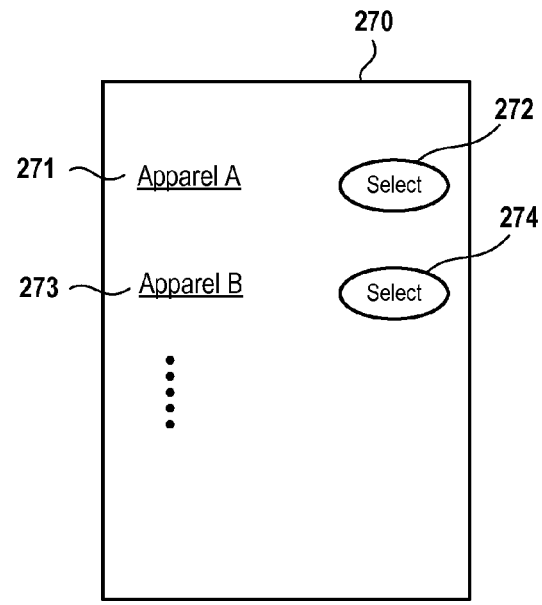
FIG. 3D  FIG. 3E
FIG. 3F  FIG. 3G

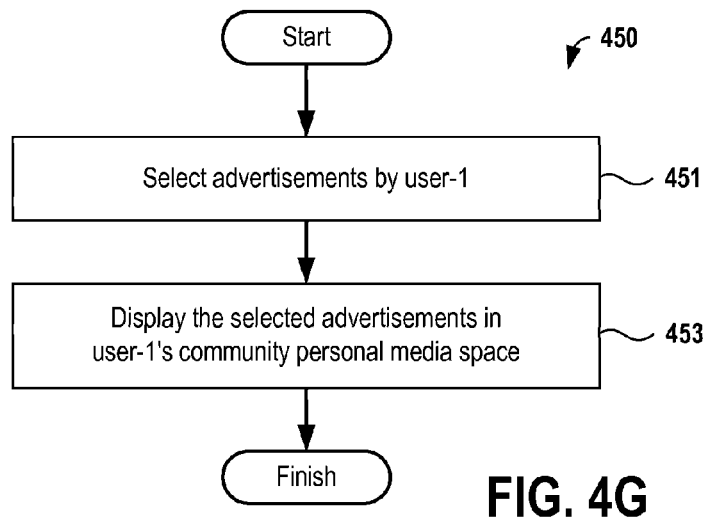
FIG. 4G
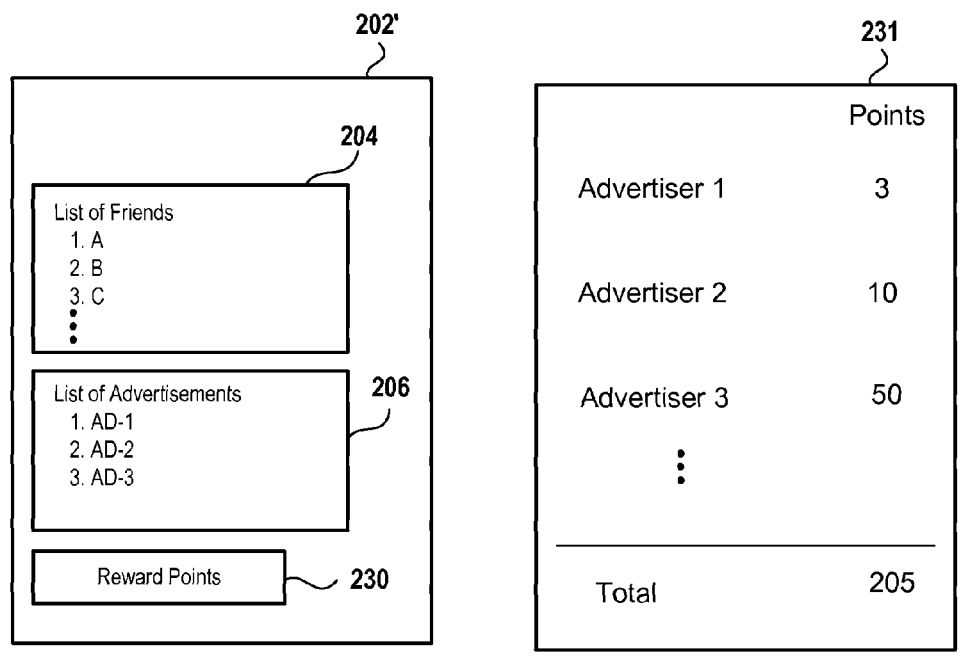
FIG. 5C
FIG. 5D

SELECTING AND DISPLAYING ADVERTISEMENT IN A PERSONAL MEDIA SPACE

BACKGROUND OF THE INVENTION

1. Field of the Invention

This invention relates generally to the displaying of advertisement in a communication personal media space, and more particularly, selecting on-line advertisement by a user to display in the user's communication personal media space for friends and/or acquaintances approved by the user to view.

2. Description of the Related Art

On-line advertising may be used by advertisers to accomplish various business goals, ranging from building brand awareness among potential customers to facilitating on-line purchases of products or services. A number of different kinds of page-based or video-based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a page to be configured to contain a location for inclusion of an advertisement. Some Internet technologies enable rich video to be used to create high quality advertisements One type of on-line advertisement is banner advertisement. A banner advertisement typically features an image (animated or static) and/or text displayed at a predetermined position in a page. The banner advertisement usually takes the form of a horizontal rectangle at the top of the page, but it can also be arranged in a variety of other shapes at any other location on the page. If a user clicks on the banner advertisement's location, image, and/or text, the user is taken to a new page that may provide detailed information regarding the products or services associated with the banner advertisement. Banner advertisements are often provided on a guaranteed number of impressions basis, though they may also be performance-based.

However, most of the on-line advertisements are not effective in reaching the on-line users because the advertisers have no knowledge or only very limited knowledge of the users. The advertisers often can only target the advertisement based on the vague understanding of the demographics of users viewing certain web sites or pages. Therefore, most of on-line advertisement is either not targeted at all, or not targeted effectively. Since the on-line advertisement is presented to the users with little or no knowledge of the on-line users, the chances for the on-line users to be interested in the advertisements are small. And, most users that are on-line simply choose to ignore a majority of on-line advertisements.

In view of the foregoing, there is a need for methods for selecting advertisements to display to users that users would find relevant. When users find the selected advertisements, which are displayed to the users, relevant to the users, the users are more likely to view the advertisement.

SUMMARY OF THE INVENTION

Broadly speaking, the present invention fills the need of selecting relevant advertisement to target users by utilizing the knowledge of friends or acquaintance of the target users. The target users and friends or acquaintances of the target users belong to the same on-line communities, groups, or circles. The friends or acquaintance of the target users select the advertisements to be displayed to the target users, or vice versa. Due to the common interests of these on-line communities, groups or circles, and also the trust built amongst these communities, groups or circles, the target users are more likely to view the advertisements. The friends or acquaintance of the target users that select the advertisement to be displayed to the target users can accumulate award points, which can be redeemed for money or goods at a later time. It should be appreciated that the present invention can be implemented in numerous ways, including as a method, a system, or a device. Several inventive embodiments of the present invention are described below.

In accordance with one embodiment, a method of providing advertising content for display in a community personal media space of an Internet networking tool of a user is provided. The method includes selecting an on-line advertisement by a first user. The method also includes displaying the selected on-line advertisement in an community personal media space of the first user. The community personal media space of the Internet networking tool of the first user is accessible to a list of users approved by the first user. The first user and the list of users approved by the first user utilize the Internet networking tool to communicate with one another.

In another embodiment, a method for providing advertising content for display in a personal media space of an Internet networking tool of a user is provided. The method includes defining the personal media space in a display region of a graphical user interface window. The personal media space being controlled by the user in terms of content. The method also includes selecting an advertisement content unit to be added to the personal media space for display by the user. The method further includes establishing a communication session between the user and another user. The communication session includes an interaction space for enabling communication between the user and the other user. The interaction space is displayed in the graphical user interface window along with the personal media space and the advertising content unit selected by the user to be displayed in the personal media space.

In yet another embodiment, computer readable media including program instructions for providing advertisement content for displaying in a community personal media space of an Internet networking tool of a user is provided. The computer readable media include program instruction for selecting an on-line advertisement by a first user. The computer readable media also include program instructions for displaying the selected on-line advertisement in a community personal media space of the Internet networking tool of the first user. The community personal media space of the first user is accessible to a list of users approved by the first user. The first user and the list of users approved by the first user utilize the Internet networking tool to communicate with one another.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 3D illustrates a list of advertisement in USER-1's IM control panel, in accordance with one embodiment of the present invention.

FIG. 3E illustrates an apparel-related advertisement selection window, in accordance with one embodiment of the present invention.

FIG. 3F illustrates a window for entering a user's personal information, in accordance with one embodiment of the present invention.

FIG. 3G illustrates a window of a particular advertisement AD-X, which allows users to express users' opinion about AD-X, in accordance with one embodiment of the present invention.

FIG. 4G illustrates a process flow of selecting and displaying advertisement in a community personal media space, in accordance with one embodiment of the present invention.

FIG. 5C illustrates an IM control panel of a user with a "reward points" button, in accordance with one embodiment of the present invention.

FIG. 5D illustrates a window showing rewards collected by a user, in accordance with one embodiment of the present invention.

DETAILED DESCRIPTION

The various embodiments describe for methods and computer driven operations for selecting relevant advertisement to target users by utilizing the knowledge of friends or acquaintance of the target users. The target users and friends or acquaintances of the target users belong to the same on-line communities, groups, or circles. The friends or acquaintance of the target users select the advertisements to be displayed to the target users, or vice versa. Due to the common interests of these on-line communities, groups or circles, and also the trust built amongst these communities, groups or circles, the target users are more likely to view the advertisements. In return, the friends or acquaintance of the target users that select the advertisement to be displayed to the target users can accumulate award points, which can be redeemed for money or goods at a later time.

There are many Internet networking tools that allow users to communicate and share information with friends or acquaintances belonging to the communities, buddies, groups, or circles or groups. People belonging to the same community, group, or circle have either common interests or goals. The examples of such on-line networking tools include, but not limited to, Yahoo!™ Instant Messaging, Yahoo!™ Groups, Yahoo™ Chats, Yahoo!360°™, Yahoo™ Blog, Yahoo™ Mail, Flickr™, Y!™ Video, Y!™ Personals, Y!™ groups, etc. Users form communities, groups, or circles to communicate, to share knowledge, or to share media, such as photos, with their friends or acquaintances belonging to the same communities, groups, or circles. Companies, other than Yahoo™, also provide similar networking tools for users. The following description will use Instant Messaging (IM) as an example of the networking tools that can be used to select and/or to deliver advertisements to target users. However, other networking tools, by Yahoo™ or by other vendors, can also be used to select and/or deliver advertisement to target users.

IM has become one of the most popular applications on the Internet. IM programs generally allow users to send and receive messages. The messages are generated and displayed by an Instant Messaging client on each end and an Instant Messaging server may perform various functions to facilitate the transfer of messages for communication or conversation. Users of IM have their own lists of friends (e.g. buddies), which include friends and/or acquaintances, who are approved by the users to communicate with users through IM. We would use to term "friends" to represent the people in the approved IM list. However, Yahoo™ IM also allows users to send messages (or chat) with people not on the IM list. Therefore, users have the option of seeing advertisements in IM from people not on the IM list, who can be called as "non-approved" friends. The term "friends" can be broadly interpreted to include people communicating with IM and include people not on the approved IM list.

Figure 1:
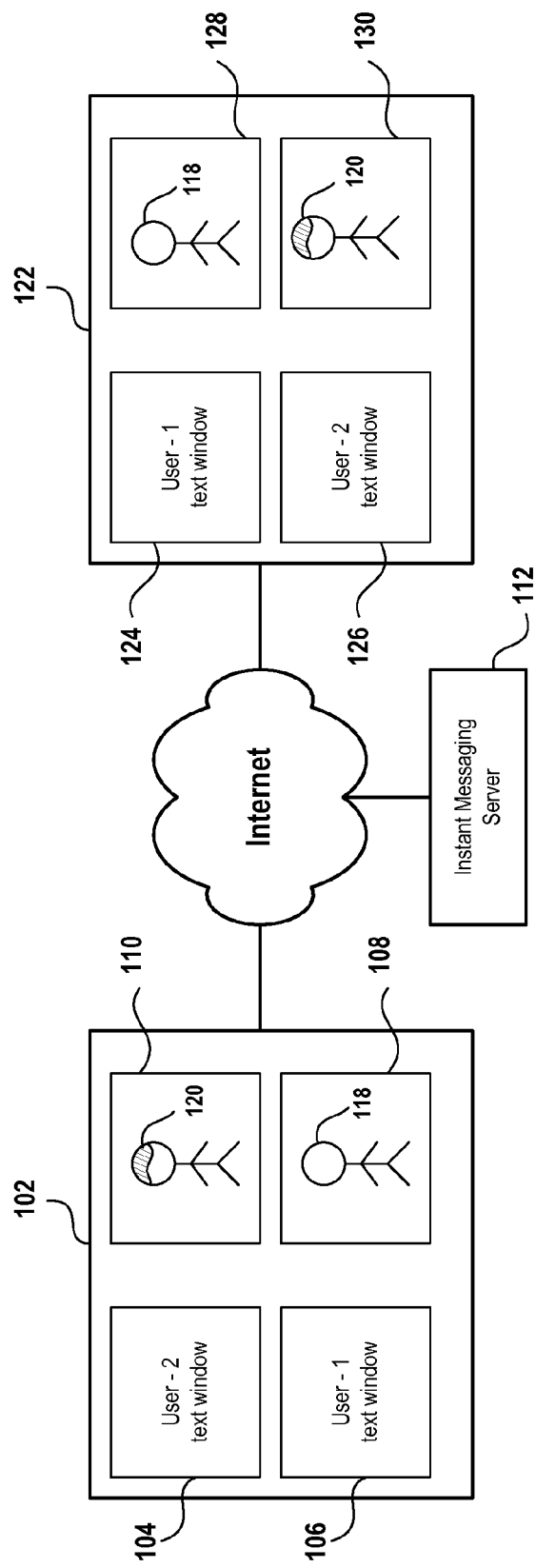
FIG. 1 illustrates a diagram of two users engaging in an Instant Messaging session, in accordance with one embodiment of the present invention.

FIG. 1 shows a diagram illustrating an exemplary Instant Messaging system operating over the Internet. An Instant Messaging client creates an Instant Messaging (IM) window 102 of USER-1 on an IM client of USER-1. The IM window 102 of USER-1 is a graphical user interface. IM window 102 of USER-1 generally includes a history window 104 containing messages that have been exchanged in the past, and a new text window 106 for new messages to be entered by USER-1. USER-1 enters messages he/she communicates with USER-2 in text window 106. The text in the text window 106 can be entered by typing in characters or symbols through a key board. Alternatively, USER-1 can "speak" numbers, characters, words or sentences to a speaker. A voice recognition decoder can then translate the spoken characters, numbers, words or sentences into texts appear on the text window 106. In one embodiment, the Instant Messaging window 102 of USER-1 contains a community personal media space (or personal media space) 108 of USER-1 to show an image selected by USER-1. The image selected by USER-1 could be a photograph of USER-1 himself/herself, a photograph that USER-1 likes, or an avatar of USER-1. The picture shown in the community personal media space can be a picture of USER-1 himself/herself or other types chosen by USER-1. An avatar is an Internet user's representation of the user commonly in the form of a two-dimensional icon that can be used in Internet forums and other virtual communities. In one embodiment, the avatar is in the form of a three-dimensional icon. In FIG. 1, an avatar 118 is used as an exemplary image that is chosen by USER-1 to be placed in USER-1's community personal media space. In another embodiment, the Instant Messaging window 102 of USER-1 contains a community personal media space 110 of USER-2, who is exchanging messages with USER-1. An avatar 120 of USER-2 appears in the community personal media space 110 of USER-2 that shows an avatar of USER-2.

A second Instant Messaging client also creates an Instant Messaging window 122 of USER-2 that also includes a history window 124 and a new text window 126. USER-2 enters messages he/she communicates with USER-1 in text window 126. Instant Messaging window 122 displays a message sent from Instant Messaging window 102 via message server 112. The Instant Messaging window 122 of USER-2 can also contains a community personal media space 130 of USER-2 and community personal media space 128 of USER-1, similar to the Instant Messaging window 102 of USER-1. In community personal space 128 of USER-1 in the IM window 122, the same avatar 118 of USER-1 in the community personal media space 108 of IM window 102 is displayed. Similarly, the avatar 120 of USER-2 of community personal media space of IM window 102 is displayed in the community personal media space 130 of USER-2 in IM window 122.

An IM server 112 is also connected to the Internet to interact with the Instant Messaging window 102 of USER-1 and the Instant Messaging widow 122 of USER-2. In various IM systems, the message server may perform different functions such as receiving messages and transferring them, replacing certain text with symbols, or otherwise modifying or relaying messages. In addition, the Instant Messaging client may display various menus and buttons that activate common Instant Messaging functions such as changing font, ringing another user, inserting symbols, etc.

As described above, USER-1 and USER-2, who are engaged in an IM session, can view each other's images in the community personal media spaces on their own IM windows 102, 122. In one embodiment, USER-1 and USER-2 can choose to close the community personal media spaces 110, 108, 128, 130 of their own and/or of their friend's. It should be noted that software intended for implementing an instruction set in an Instant Messaging environment may be generally referred to as an Instant Messenger application or IM application.

Since USER-1 and USER-2 are friends or acquaintances, USER-1 and USER-2 would be interested in viewing each other's images in their own community personal media spaces 108, 110, 128, and 130, during the IM session. However, the images 118, 120 are static, or almost static. For example, some avatars are designed to blink their eyes, and not much else. USER-1 and USER-2 would most likely stop looking at the images after the initial glances in the beginning of the IM session. Users, such as USER-1 and USER-2, focus their attention on the IM windows, such as windows 102, 122. The community personal media spaces on the IM windows would be ideal spaces to display advertisements and/or promotions, for example after a quick display of the image of USER-1 or USER-2. The advertisements and promotions mentioned here can be offered by advertisement companies or directly by vendors selling goods or services. Promotions can include special deals or offers for buyers. In the description below, advertisements also include promotions.

USER-1 knows the people on his/her IM list of friends and has common interests or goals with them. The examples of knowledge that USER-1 has regarding the people on his/her IM list of friends include, but not limited to, age, gender, interests, school(s) attended, wealth level, income, etc. In addition, since the people on USER-1's IM list of friends are approved by USER-1 to engage in IM sessions with USER-1, there is certain amount of trust between USER-1 and each member on USER-1's IM list. If the advertisements displayed in the community personal media space(s) are selected by USER-1 to display for people on USER-1's IM list of friends to view during IM sessions with USER-1, USER-1's knowledge of people on the IM list would make the selected advertisements more to relevant those people. Therefore, the advertisement delivered in this manner would be much more effective than a conventional advertisements-delivering mechanism, which delivers advertisements with limited or no knowledge of the recipients.

Figure 2:
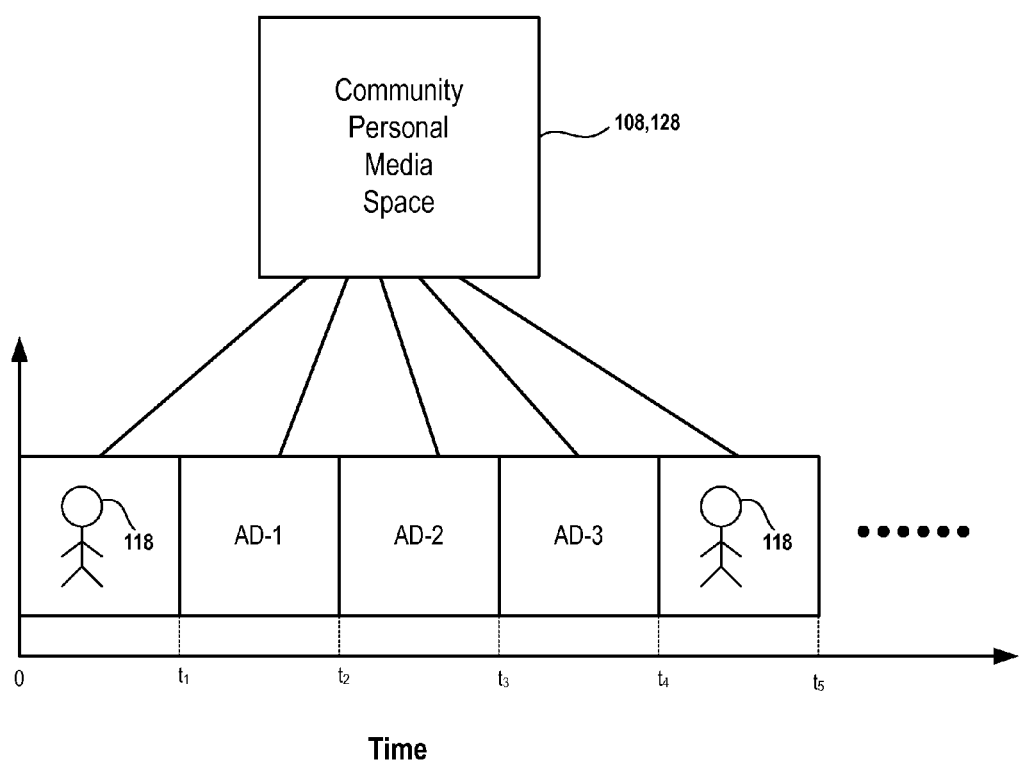
FIG. 2 illustrates displaying of USER-1's image and advertisements selected by USER-1 in USER-1's community personal media space, in accordance with one embodiment of the present invention.

In one embodiment, one or more pieces of advertisement selected by USER-1 are rotated in the community personal media space 108, 128 of USER-1, as show in FIG. 2, along with the originally displayed image 118. In FIG. 2, during the period between time zero and time $t_1$, USER-1's chosen image 118 is displayed in the personal space 108, 128 of USER-1. Afterwards, during the period between time t1 and time t2, a first advertisement (or AD-1) is displayed in the community personal media space 108, 128. During the period between time $t_2$ and time $t_3$, a second advertisement (or AD-2) is displayed in the community personal media space 108, 128. During the period between time $t_3$ and time $t_4$, a third advertisement (or AD-3) is displayed in the personal space 108, 128. During the period between time $t_4$ and time $t_5$, USER-1's image 118 is displayed in the personal space 108 again. Afterwards, AD-1, AD-2, and AD-3 are displayed sequentially. The rotating display continues until the IM session between USER-1 and USER-2 is over. The displaying sequence described above is merely an example. Other displaying sequences are also possible.

The advertisements, such as AD-1, AD-2, and AD-3, displayed in the community personal media space 108, 128 are selected by USER-1. USER-1 knows the people in his/her IM list of friends. USER-1 chooses advertisements that USER-1 likes or USER-1 thinks his/her friends would like. As described above, USER-1 and members of USER-1's IM list have something in common. For example, they could be in the same age group, go to the same school, work in the same company, be interested in the same sport, etc. USER-1 and member of USER-1's IM list form a networking circle, which can also be called a networking group or a networking community. The types of advertisements USER-1 chooses to display for USER-1's networking circle would interest people in the same networking circle, since they have something in common, have knowledge of one another, and are either friends or acquaintances. There is a certain degree of trust in the networking circle.

Figure 3A:
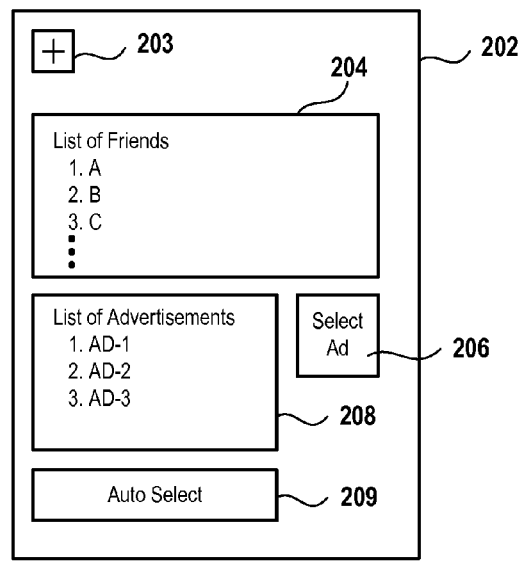
FIG. 3A illustrates a control panel of USER-1, in accordance with one embodiment of the present invention.

FIG. 3A shows an embodiment of an IM control panel 202 for USER-1. In the control panel there is a display 204 of a list of friends communicating with USER-1 through IM. The list of friends includes A, B, C, etc. In one embodiment, near the display 204 of a list of friends there is a button 203, which when is used to add additional members to the list of friends. In one embodiment, when button 203 is clicked, a window (not shown) would pop up to allow USER-1 to add members to his/her list of IM friends. In one embodiment, members in the list of friends, such as A, B, or, C, can be deleted by performing a "right" click on the mouse when the cursor is placed over the name (or code name) of a member of the list of friends.

In the control panel 202, there is a display 208 of a list of advertisements selected by USER-1 for display in USER-1's community personal media space, such as 108, 128 described above. The list of advertisements includes AD-1, AD-2, and AD-3, etc. In one embodiment, next to the display 208 of the list of advertisements, there is a button 206 for selecting advertisements to add to the list of advertisements. In one embodiment, the advertisements in the list of advertisements, such as AD-1, AD-2, or AD-3 can be deleted by performing a "right" click on the mouse when the cursor is placed over a particular advertisement in the list, such as AD-1, AD-2, or AD-3.

Figures 3B, 3C:
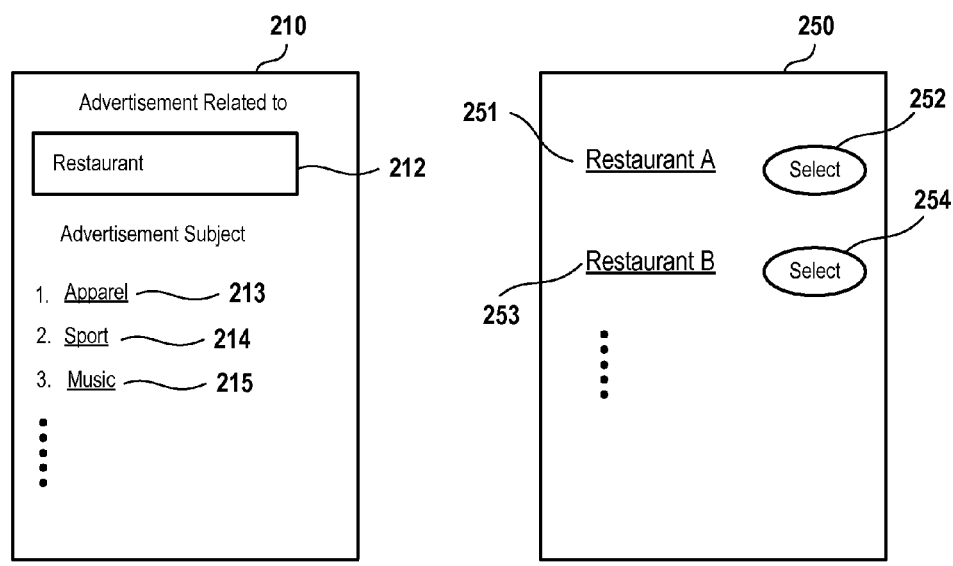
FIG. 3B illustrates a control panel that pops up after the select advertisement button 206 is pushed, in accordance with one embodiment of the present invention.
FIG. 3C illustrates a window listing advertisements related to "restaurant", in accordance with one embodiment of the present invention.

FIG. 3B shows one embodiment of a window of control panel 210 that pops up when button 206 is clicked. In the control panel 210, there is keyword field 212 which allows USER-1 to enter a keyword, such as "restaurant" to search for advertisements related to the entered keyword. When the keyword "restaurant" is entered into the field 212 and the return key is pressed, a window 250 listing advertisements related to "restaurant" pops up. In the window 250, there is a list of restaurants that provides advertisements. For example, the list includes "Restaurant A" 251, "Restaurant B" 253, etc. USER-1 then chooses one or more restaurants that USER-1 likes or USER-1 thinks his/her friends might like or might be interested in. For example, USER-1 chooses "Restaurant A" 251 by clicking on the selection button 252 for "Restaurant A". Afterwards, "Restaurant A" would appear in the list of advertisements in display 208 below the originally selected AD-1, AD-2, and AD-3. In one embodiment, the advertisements shown in the list of advertisements 208 of FIG. 3D are rotated to be displayed in the community personal media spaces 108, 128 of USER-1 during IM session between USER-1 and USER-2, in a manner described in the description of FIG. 2.

Alternatively, advertisement can also be categorized and be shown under different subjects, such as apparel, sport, and music, etc., as shown in FIG. 3B. USER-1 can move a cursor (or mouse) over to one of the subjects, such as apparel, and click on the subject. Once the subject, such as apparel, is chosen (or clicked), a window 270 pop up, as shown in FIG. 3E. In window 270 there is a list of apparel advertisements, such as "Apparel A" 271 and "Apparel B" 273", that are sponsored by advertisers for USER-1 to choose from. If USER-1 chooses one of the apparel advertisements by clicking on one of the selection buttons 272, 274 next to the apparel advertisements, the chosen apparel advertisement is added to the list of advertisements 208 to be displayed in USER-1's community personal media space, such as 108, 128.

In another embodiment, the list of advertisements can also be generated by clicking on the "Auto Select" button 209 in FIG. 3A to allow the system to generate the list of advertisements for USER-1 based on USER-1's age, gender, interests, etc. USER-1's personal information regarding age, gender, interests, etc., can be entered earlier and is stored in the system. Alternatively, USER-1's personal information regarding age, gender, interests, etc., can also be entered after the "Auto Select" button 209 is clicked. A window 290 can pop up after the "Auto Select" button 209 is clicked, as shown in FIG. 3F. USER-1 is asked to enter personal information, such as age, gender, interests, education, and income level, etc., in window 290. The information can be entered either by entering keywords, by clicking on a particular choice, or by other commonly known information collection mechanisms used on-line. The system collects the personal information of USER-1 and selects the advertisements for USER-1 to be displayed in USER-1's community personal media space, such as 108, 128.

In another embodiment, the system presents advertisements to USER-1 to "approve" or "disapprove" to gain knowledge of whether the advertisement appeals to users, such as USER-1. FIG. 3G shows a window 295 of a particular advertisement AD-X 296, which could be a game, a video, or an advertisement page, etc., provided by one of the advertisers. AD-X 296 can also be a picture, an image, an icon, a graphic, or a clip. USER-1 can choose to select "approve" or "disapprove" before or after viewing AD-X by clicking on the button 297 or 298. In addition, USER-1 can also enter his/her comments by in the comment field 299 to provide feedback to the advertiser. Alternatively, USER-1 can also select a rating over a scale, such as 1 to 5, by pressing a button, such as button 300, which has a rating of 5. By collecting the data of hits on "Approve", "Disapprove", rating buttons, and entered comments from USER-1, the system (and the advertisers) gain knowledge on what types of advertisements appeal to USER-1. The comments collected can also be used to improve the designs of the advertisements.

Figure 3H:
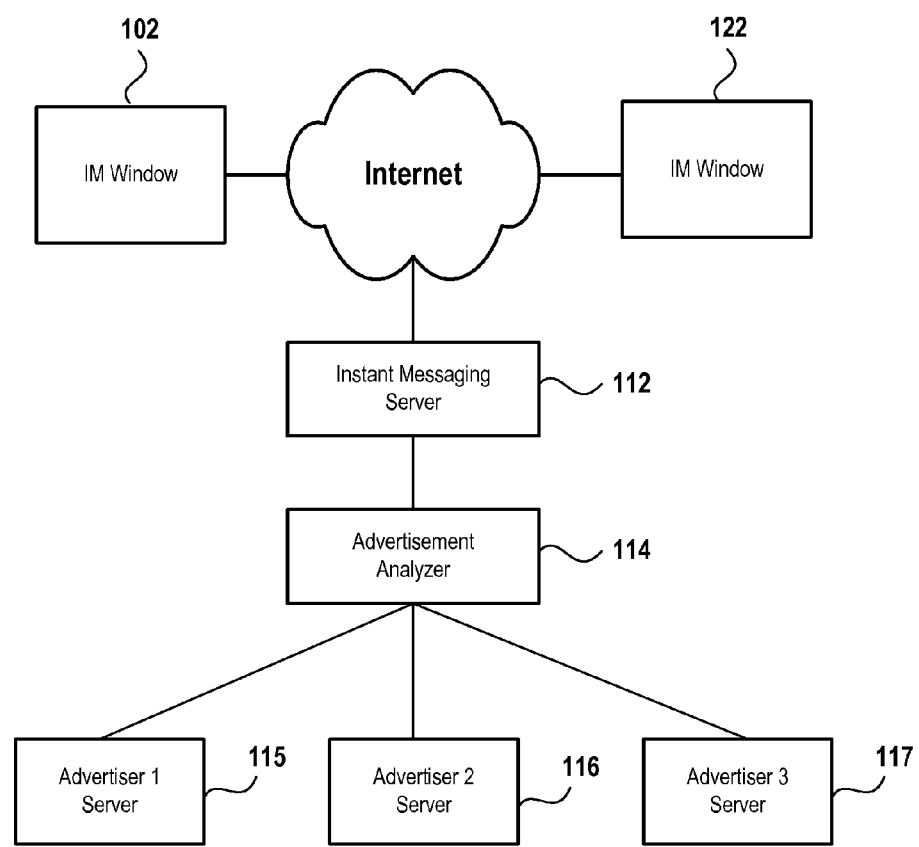
FIG. 3H illustrates an advertisement analyzer coupled to the Instant Messaging server and the servers of the advertisers, in accordance with one embodiment of the present invention.

FIG. 3H shows an advertisement analyzer 114 that is coupled to the Instant Messaging server 112, in accordance with one embodiment of the current invention. The advertisement analyzer 114 collects inputs from users, such as USER-1 and USER-2, regarding whether the advertisements appeal to them and their opinion regarding the advertisements and analyzes the results. The analyzed results are then sent to servers belonging to various advertisers, such as advertiser 1 server 115, advertiser 2 server 116, and advertiser 3 server 117, etc. In another embodiment, the advertisement analyzer 114 is part of message server 112.

Figure 4A:
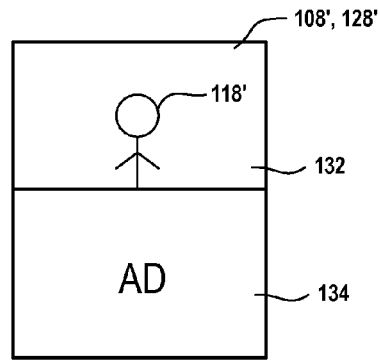
FIGS. 4A-4C illustrate USER-1's community personal media space displaying selected advertisement, in accordance with various embodiments of the present invention.
Figure 4B:
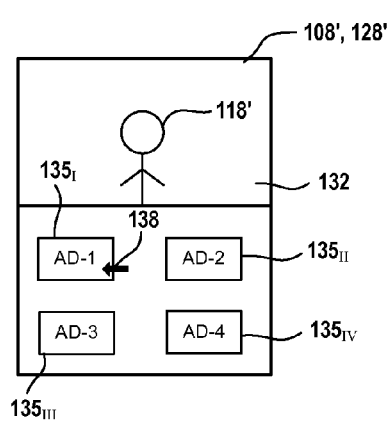
Figure 4C:
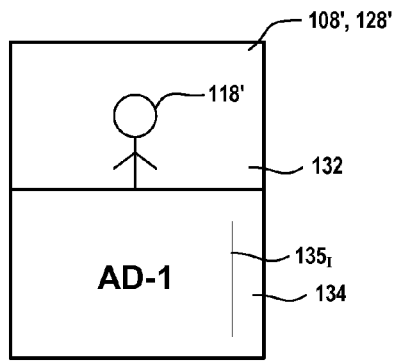

Once the list of advertisement is selected, the list can be displayed in the manner described in FIG. 2, in accordance with one embodiment of the current invention. However, display of an advertisement in the community personal media spaces 108, 128 of USER-1 is not limited to the method and manner described in FIG. 2. In one embodiment, a community personal media spaces 108', 128' of USER-1 is divided into two portions, as shown in FIG. 4A. An upper user portion 132 is used to display the image, such as avatar 118', chosen by USER-1. A lower advertisement portion 134 is used to display the advertisements selected by USER-1. The image chosen by USER-1 to be displayed in the upper portion 132 is shrunk or truncated to a smaller size to fit in the upper user portion 132. In one embodiment, advertisements in the list of advertisements are rotated in the lower advertisement portion 134, in a similar manner to that described in FIG. 2. Since USER-1's image (or a truncated avatar 118' in this example) is shown in the upper user portion 132, USER-1's image does not need to be rotated with the advertisements in the list of advertisements to be shown in the lower advertisement portion 134. Only the advertisements are shown in the lower advertisement portion 134. Alternatively, the list of advertisement can be displayed on advertisement portion 134, as shown in FIG. 4B. The advertisement can be displayed as symbols or icons of the advertisements, or links to the advertisements. When a cursor 138 is moved over the advertisement, such as AD-1 $135_I$ of FIG. 4B, and a "click" is performed on the advertisement AD-1 $135_I$, the selected advertisement AD-1 $135_I$ is displayed in the advertisement portion 134, as shown in FIG. 4C. AD-1 $135_I$ displayed in the lower portion 134 can include a video, a game or an advertisement page with information about the advertiser, the product(s), promotion, etc.

Figure 4D:
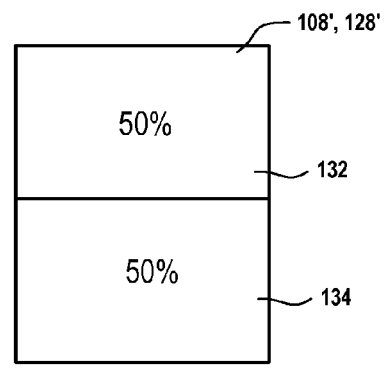
FIGS. 4D-4E illustrate different percentages of USER-1's community personal media space being used to display advertisements, in accordance with two embodiments of the present invention.
Figure 4E:
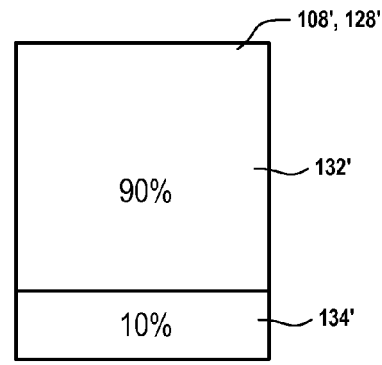

USER-1 can decide the percentage of his/her community personal media spaces 108', 128' that would be utilized to show his/her image 118'. The remaining portion is used to show the selected advertisements. For example, USER-1 can choose 50% of his/her community personal media spaces 108', 128' to be used to show an advertisement, as shown in FIG. 4D. USER-1 can also choose 10% of his/her personal space 108 to be used to show advertisement, as shown in FIG. 4E.

USER-1 may want to select and display advertisements because he/she wants his/her friends to know what types of stores that he/she likes or likes to shop. In addition, the advertisers can provide incentives (or rewards) for USER-1 to carefully select advertisements and displayed the advertisements to USER-1's friends (on the IM list). With the provided incentives to USER-1, USER-1 would be more motivated to spend time to select advertisements and to provide a portion of his/her community personal media space to display these selected advertisements. The incentives can be set up to correlate to the responses from USER-1's friends during the IM sessions. If USER-1's friend, such as USER-2 in an IM session with USER-1, clicks to view one or more advertisements, USER-1 can get a certain amount of reward points, provided by the advertisers. If USER-2 only moves the cursor over the advertisements selected by USER-1, USER-1 can also get a lesser amount of reward points. The reward points can be accumulated to be redeemed at stores, which could be physical stores or on-line stores. Therefore, by selecting and displaying these on-line advertisements, USER-1 not only lets his/her friends know what types of stores or goods USER-1 likes, but also benefits financially or materially, since the advertisers provide rewards based on how many of and how many times USER-1's friends, such as USER-2, view the advertisements.

Figure 4F:
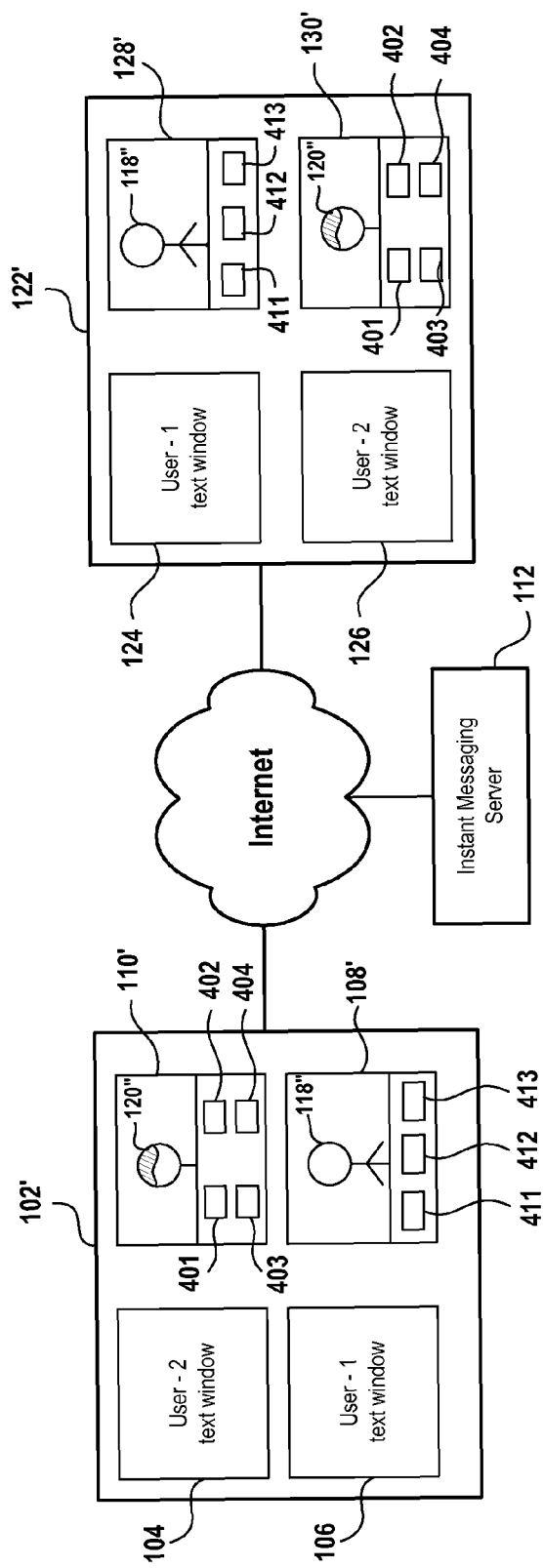
FIG. 4F illustrates an IM session between USER-1 and USER-2, in accordance with one embodiment of the present invention.

FIG. 4F shows an Instant Messaging window 102' of USER-1 and an Instant Messaging window 122' of USER-2, in accordance with one embodiment of the present invention. USER-1 and USER-2 are engaged in an IM session. USER-1's image 118" and selected advertisement 411, 412, 413 are displayed in USER-1's community personal media space 108 of window 102' of USER-1 and USER-1's community personal media space 128' of window 122' of USER-2. At the same time, USER-2's image 120" and selected advertisement 401, 402, 403, 404 are displayed in USER-2's community personal media space 110' of window 102' of USER-1 and USER-2's community personal media space 130' of window 122' of USER-2. In this embodiment, USER-1 and USER-2 can view each other's selected advertisements. They can earn reward points for each other by "mousing" over or clicking on the other person's selected advertisements. By doing so, in addition to knowing the stores/goods that their friend(s) promote better, they accumulate reward points for their friend(s). In addition, they also know more (such as taste, likes, shopping habits, etc.) about their friends.

USER-1 can get a "X" number of points of reward from advertiser of AD-1 if USER-2 simply "mouses over" advertisement 411, as shown in FIG. 4B. If USER-2 is really interested in advertisement 411 and clicks on advertisement 411 to display the content of advertisement 411, as shown in FIG. 4C, USER-1 can get a "Y" number of points from the advertisement. Y is most likely to be larger than X. If USER-1 accumulates sufficient number of points from the advertiser of advertisement 411 from various friends or acquaintances in different IM sessions, USER-1 can later redeem these points, such as with advertiser for advertisement 411. As discussed above, with incentives (or rewards), USER-1 is more likely to carefully select the advertisement to display to his friends and acquaintances to make financial and/or material gain. Therefore, with the motivating incentives, the knowledge of USER-1 of his/her friends can be utilized to effectively promote stores or goods to USER-1's friends and acquaintances. Since the advertisements are carefully chosen with knowledge of the target users, the advertisements have higher chances of reaching the target users. In addition, USER-1 and USER-1's friends have a certain amount of trust and influence over one another. The trust and influence between them would make the delivery of the advertisement even more effective. USER-1's friends might be more inclined to make purchases of certain goods or in certain stores because USER-1 recommends or promote the products or stores.

The reward points do not need to be linked to a specific advertiser. The reward points can be collected from a different advertiser and be redeemed at one or more stores identified by the advertisers. In a way, it's similar to a credit card user who can accumulate points by using credit card to make purchases. The points accumulated by spending money with the credit card can be used to redeem airline ticket(s) with one or more airlines in agreement with the credit card company. Similarly, USER-1 can accumulate reward points with different advertisers and use the reward points with one or more stores that are in agreement with the advertisers promoting on-line advertisements through IM.

FIG. 4G shows an embodiment of a process flow chart 450 of USER-1 selecting and displaying advertisements in USER-1's community personal media space(s). At step 451, USER-1 selects advertisement(s) that USER-1 wants to display to his/her friends on the IM list. The advertisements can be seen when USER-1 is engaged in an IM session with one member (or friend) on the IM list. After the advertisements are chosen, they are displayed in USER-1's community personal media space at step 453. In one embodiment, the advertisements are displayed during an IM session between USER-1 and a member (or a friend) of USER-1's IM list. Prior to displaying the advertisements, USER-1 might need to specify what portion (or percentage) of USER-1's community personal media space would be used for displaying the advertisement.

Figure 5A:
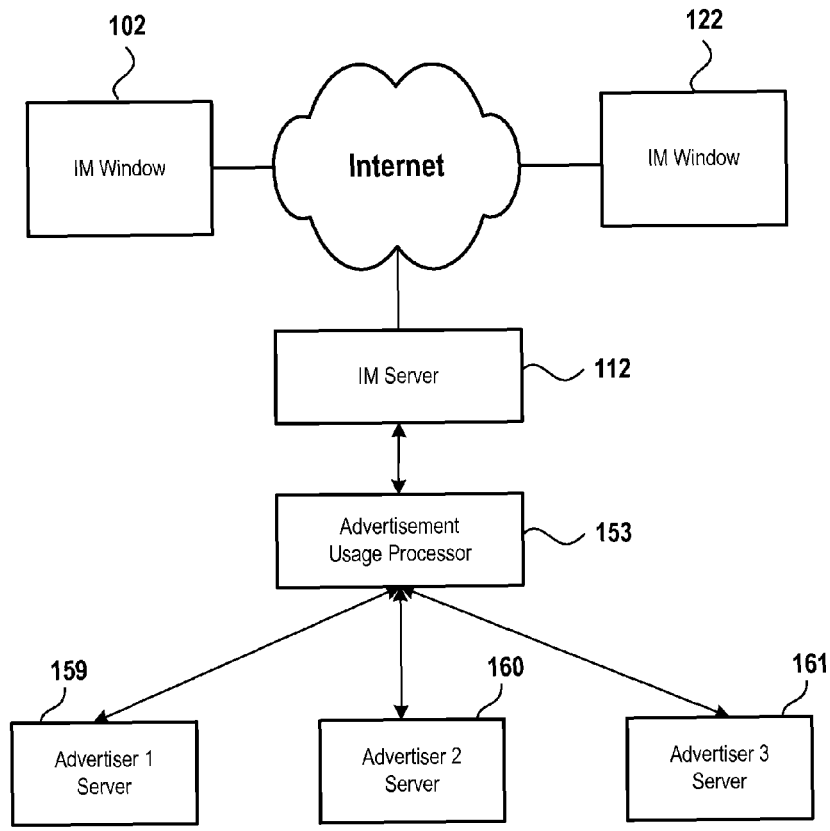
FIG. 5A illustrates an advertisement usage processor coupled to an IM server and servers of advertisers, in accordance with one embodiment of the present invention.
Figure 5B:
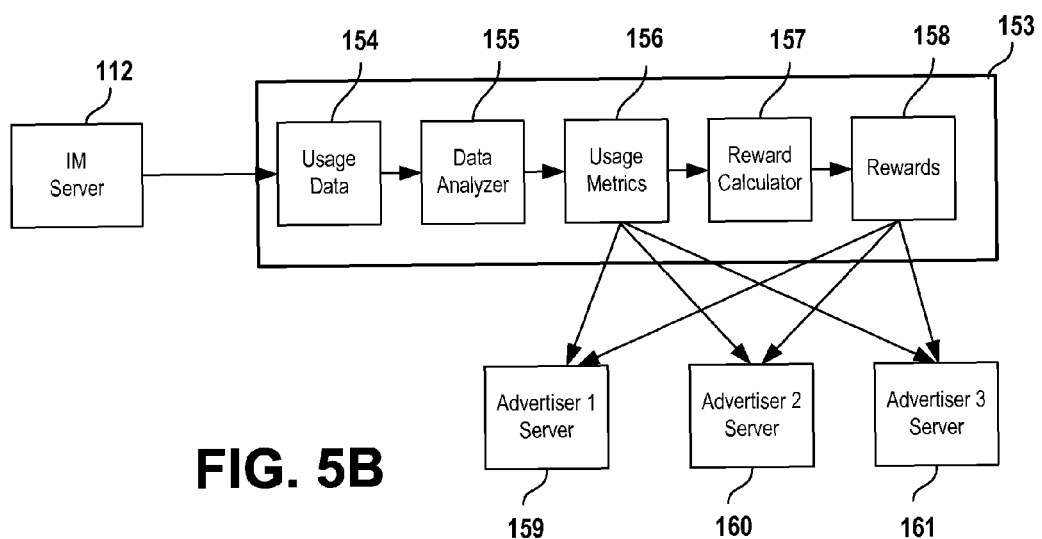
FIG. 5B illustrates the elements in the advertisement usage processor of FIG. 5A, in accordance with one embodiment of the present invention.

FIG. 5A shows the Instant Messaging (IM) server 112 coupled to an advertisement usage processor 153, in accordance with one embodiment of the current invention. In another embodiment, the advertisement usage processor 153 resides in the IM server 112. The IM server 112 collects the usage data and passes the usage data to the advertisement usage processor 153 for analyzing the usage data. In one embodiment, the advertisement usage processor 153 collects usage data 154, which are then fed into a data analyzer 155, as shown in FIG. 5B, in accordance with one embodiment of the present invention. After the usage data 154 are analyzed, the usage data 154 become usage metrics 156. For example, the usage metrics 156 can include number of clicks, number of cursor-overs, codes representing which friends of USER-1 contribute to the clicks or cursor-overs, and which advertisements, etc. The usage metrics 156 are then fed into a reward calculator 157, which calculates rewards or reward points 158 for users of connected to IM server 112, such as USER-1 and USER-1's friends. In one embodiment, the data rewards or reward points 158 calculated are then fed back to the message servers 112 or are fed to different servers belonging to different advertising companies, such as advertiser 1 server 159, advertiser 2 server 160, and advertiser 3 server 161, etc. The usage metrics 157 and rewards data or reward points 158 sent to various servers belonging to different advertisement companies allow the advertising companies to know how many users have viewed their ads to gauge the effectiveness of their ads. Alternatively, the data are not sent to servers of the advertising companies. Instead, the company owning the IM server 112 prepares reports for the advertising companies.

The rewards data or reward points 158 from the advertisement usage processor 153 are sent to the IM server 112, which then passes the rewards data or reward points 158 to IM control panel 202 of USER-1 to let USER-1 know how many rewards and/or reward points he/she has accumulated. FIG. 5C shows an embodiment of a control panel 202' of USER-1, which include a display 204 of a list of friends, a display 206 of a list of advertisements selected by USER-1 to be displayed, and a button 230 of accumulated points. When USER-1 clicks on the button of the accumulated points 230, USER-1 can view the reward and/or reward points that USER-1 has accumulated. FIG. 5D shows an embodiment of a window 231 which pops up when the button 230 is pushed. In window 231, a metric shows how many points for each advertiser USER-1 has accumulated. For example, USER-1 has accumulated 3 points with advertiser 1, 10 points with advertiser 2, and 50 points with advertiser 3. Accumulating a certain number of points would qualify USER-1 to exchange certain goods with a certain advertiser or to redeem certain goods with a particular vendor. For example, USER-1 has accumulated 50 points with advertiser 3, which might qualify him for a free cup of coffee with a store working with the advertising companies. In the example shown in FIG. 5D, USER-1 has accumulated 205 points, which might allow USER-1 to use 200 points out of the 205 points to purchase a music CD with a store working with the advertising companies.

The reward and/or reward points entice users to select and display relevant advertisements to users' circles of friends. The circles of friends of the users based on their trust of users or their interests in getting to know the users better would be more likely to view the advertisement. Therefore, advertisements delivered in this manner become very effective, since the advertisements are "pulled" by users, such as USER-1, and "pushed" by users, such as USER-1, to their friends, whom they have knowledge of. In addition, with the enticement of rewards, users, such as USER-1, are more willing to give inputs on the advertisements, for example using the exemplary mechanism shown in FIG. 3H. Advertisers can use these inputs to better refine their advertisements and to better target their customers.

The concept of this invention can be applied to any on-line communication or networking tools that utilizes community personal media space and is not limited to IM. For example, Yahoo!360°™ also allows community personal media space. In Yahoo!360°™, there is also a space for a personally selected picture or avatar. Friends of a user of Yahoo! 360°™ are invited to view the 360° profile of the user. During viewing of the 360° Profile, friends can move cursors over or click through the advertisements presented in the Yahoo! 360°™.

As described above, additional examples of such on-line networking tools include, but are not limited to Yahoo™ Groups, Yahoo!360°™, Yahoo™ Blog, Yahoo™ Mail, Flickr™, Y!™ Video, Y!™ Personals, etc. Networking tools offered by companies, other than Yahoo™, with community personal media space may also use the methods and systems described above to deliver advertisements.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method of providing advertising content for display in a community personal media space of an Instant Messaging (IM) window of an Internet networking tool of a user, comprising:

receiving selection of an on-line advertisement by a first user, the on-line advertisement being one of existing on-line advertisements selected from categories of advertisement subjects; and displaying the selected on-line advertisement in an community personal media space of the first user, the community personal media space being part of the IM window, the community personal media space of the first user is accessible to a list of users approved by the first user through the IM window, and the first user and the list of users approved by the first user utilize the IM window to communicate with one another;

tracking interaction with the selected on-line advertisement by users on the list of users approved by the first user; and assigning rewards for the first user based on the tracked interaction with the selected on-line advertisement.

2. The method of claim 1, further comprising:

displaying the selected on-line advertisement in the community personal media space of the first user to a second user viewing the community personal media space of the first user; wherein the second user is a member of a list of users approved by the first user, and the first user and the second users interact with each other through a content entry region in the IM window of the Internet networking tool.

3. The method of claim 1, wherein the selected on-line advertisement or an icon representing the selected on-line advertisement is displayed in a portion of the community personal space of the first user along with a non-advertisement image selected by the first user.

4. The method of claim 1, wherein the other portion of the community personal media space of the first user displays an image selected by the first user.

5. The method of claim 4, wherein the image selected by the first user is an avatar of the first user or picture or graphic.

6. The method of claim 2, wherein the community personal media space of the first user is displayed in the IM window of the second user, the first user and the second user accessing an IM session.

7. The method of claim 2, further comprising:
detecting movement of a cursor over the selected on-line advertisement in the community personal media space of the first user by the second user, such that detection of movement is considered tracked interaction.

8. The method of claim 2, wherein the tracking interaction further comprising:
detecting movement of a cursor over the selected on-line advertisement in the community personal media space of the first user by the second user; and
detecting clicking on the selected on-line advertisement in the community personal media space of the first user by the second user to display full content of the selected on-line advertisement.

9. The method of claim 7, wherein the first user receives a first number of reward points when the second user moves the cursor over the selected on-line advertisement in the community personal media space of the first user.

10. The method of claim 8, wherein the first user receives a first number of reward points when the second user moves the cursor over the selected on-line advertisement in the community personal media space of the first user, and receives a second number of reward points when the second user clicks on the selected on-line advertisement in the community personal media space of the first user to display the full content of the selected on-line advertisement.

11. The method of claim 10, wherein the first user accumulates the first number of reward points and the second number of reward points from the second users and other users moving the curser and clicking on the selected on-line advertisement in the community personal media space of the first user.

12. The method of claim 1, wherein the community personal media space of the first user is further displayed in a window of an Internet community tool selected from the group consisting of Internet chat, Internet phone calls, Internet blog, Internet mail, and Internet personal profile, the Internet community tool allowing exchanges between the first user and other users approved by the first user.

13. The method of claim 11, wherein the reward points are provided by a sponsor of the selected on-line advertisement.

14. The method of claim 1, wherein the selected on-line advertisement is a picture, an image, a video, a clip, a web page, an on-line game, an icon, a graphic, or a combination thereof.

15. The method of claim 2, wherein the selected on-line advertisement is displayed as an icon representing the selected on-line advertisement in the community personal media space of the first user.

16. A method for providing advertising content for display in a personal media space of an Internet networking tool of a user, comprising:
defining the personal media space in a display region of a graphical user interface window, the personal media space being controlled by the user in terms of content;
detecting selection of an advertisement content unit to be added to the personal media space for display by the user, the advertisement content unit being sponsored by a particular advertiser who is different than the user; and
establishing a communication session between the user and another user, the communication session including an interaction space for enabling communication between the user and the other user, the interaction space being displayed in the graphical user interface window along with the personal media space and the advertising content unit selected by the user to be displayed in the personal media space;
tracking interaction with the advertising content unit by the other user during the communication session;
maintaining a history of interaction with the advertising content unit; and
defining rewards to the user based on the history of interaction.

17. The method of claim 16, wherein the Internet networking tool of the user is one of an instant messaging system, a chat system, a blog system, a social network system, or an electronic mail system.

18. The method of claim 16, wherein controlling the content of the personal media space by the user further comprises,
selecting a portion of the display region of the personal media space to be dedicated to the advertising content unit.

19. The method of claim 16, further comprising,
enabling selection of additional advertising content units to be integrated into the personal media space.

20. The method of claim 16, wherein the advertising content unit is defined as one of an image, a picture, a video, a game, an icon, text, a graphic, or combinations thereof.

21. The method of claim 16, wherein the personal media space of the Internet networking tool of the user is accessible to a list of users approved by the user.

22. Computer readable media including program instructions for providing advertising content for display in a community personal media space of an Instant Messaging (IM) window of an Internet networking tool of a user, comprising:
program instruction for receiving selection of an on-line advertisement by a first user, the on-line advertisement being one of existing on-line advertisements selected from categories of advertisement subjects; and
program instruction for displaying the selected on-line advertisement in an community personal media space of the first user, the community personal media space being part of the IM window, the community personal media space of the first user is accessible to a list of users approved by the first user through the IM window, and the first user and the list of users approved by the first user utilize the IM window to communicate with one another;
program instruction for tracking interaction with the selected on-line advertisement by users on the list of users approved by the first user; and
program instruction for assigning rewards for the first user based on the tracked interaction with the selected on-line advertisement.

23. The computer readable media of claim 22, further comprising:
program instruction for displaying the selected on-line advertisement in the community personal media space of the first user to a second user viewing the community personal media space of the first user; wherein the second user is a member of a list of users approved by the first user, and the first user and the second users interact with each other through a content entry region in the IM window of the Internet networking tool.

24. The computer readable media of claim 22, wherein the selected on-line advertisement or an icon representing the selected on-line advertisement is displayed in a portion of the community personal space of the first user along with a non-advertisement image selected by the first user.

25. The computer readable media of claim 22, wherein the other portion of the community personal media space of the first user displays an image selected by the first user.

* * * * *